United States Patent [19]

Kraus

[11] Patent Number: 4,858,484

[45] Date of Patent: Aug. 22, 1989

[54] INFINITELY VARIABLE TRACTION ROLLER TRANSMISSION

[75] Inventor: Charles E. Kraus, Austin, Tex.

[73] Assignee: Excelermatic Inc., Austin, Tex.

[21] Appl. No.: 112,392

[22] Filed: Oct. 26, 1987

[51] Int. Cl.$^4$ ............................................. F16H 15/08
[52] U.S. Cl. ......................................... 74/200; 74/208
[58] Field of Search ................. 74/201, 200, 199, 190, 74/208, 209

[56] References Cited

U.S. PATENT DOCUMENTS

| | | | |
|---|---|---|---|
| 1,856,249 | 5/1932 | Hayes | 74/200 |
| 2,660,897 | 12/1953 | Neidhart et al. | 74/200 |
| 3,159,042 | 12/1964 | Kraus | 74/200 |
| 3,727,474 | 4/1973 | Fullerton | 74/200 |
| 4,086,820 | 5/1978 | Kraus et al. | 74/200 |
| 4,484,487 | 11/1984 | Kraus | 74/200 |
| 4,576,055 | 3/1986 | Kraus | 74/200 |
| 4,702,118 | 10/1987 | Kraus | 74/200 |

FOREIGN PATENT DOCUMENTS 382865   5/1973   U.S.S.R. ............................... 74/200

Primary Examiner—Leslie A. Braun
Assistant Examiner—Scott Anchell

[57] ABSTRACT

An infinitely variable traction roller transmission with at least two traction rollers arranged between, and in engagement with, opposite toric traction discs for the transmission of motion therebetween includes, for each traction roller, a pivotal support trunnion provided with support rollers at opposite ends thereof and the housing of the transmission has partial circular tracks for supporting the support rollers and the trunnions to provide the engagement forces for the traction rollers with the toric discs.

9 Claims, 3 Drawing Sheets

INFINITELY VARIABLE TRACTION ROLLER TRANSMISSION

BACKGROUND OF THE INVENTION

The invention relates to an infinitely variable traction roller transmission in which power is transmitted through traction rollers pivotally supported in a housing between toric input and output discs.

In such transmissions, the traction rollers are mounted on support structures which, when pivoted, cause engagement of the traction rollers with the toric discs in circles of varying diameters depending on the desired transmission ratio. The pivotal traction rollers are so supported that they can be moved axially for initiating a change in the transmission ratio. For example, two traction rollers may be supported opposite one another by flexible tension sheets as shown in U.S. Pat. No. 4,086,820 which issued May 2, 1978 to Charles E. Kraus.

In the arrangement according to U.S. Pat. Nos. 4,484,487 and 4,576,055 also assigned to the assignee of the present application, the traction roller support structure is hydraulically supported directly on the housing so that the support structure is not subjected to bending forces. Pivoting of the opposite roller support structures for appropriate transmission ratio positions may be coordinated by an interconnecting ribbon as shown in U.S. Pat. No. 4,086,820, for example.

In the arrangement according to the present inventor's U.S. Pat. No. 4,702,118 the traction roller support members are pivotally supported with respect to the transmission housing by means of antifriction bearing segments which are disposed at opposite ends of the support members and directly mounted on the housing. Although this arrangement is good, the bearing segments are quite expensive and therefore the arrangement as a whole becomes too expensive for small transmissions.

Furthermore, in many small transmissions the power is usually transmitted in the same direction, that is, from one toric disc, the input disc, to the other toric disc, that is, the output disc. In many applications, the output disc torque is the highest at relatively low output disc speed, that is, when the traction rollers are tilted so as to engage the output disc at a large contact circle and the input disc at a small contact circle, and it is the lowest at relatively high output disc speed, that is, when the traction rollers are tilted so as to engage the output disc at a small contact circle and the input disc at a large contact circle. With the larger torque being transmitted at relatively low output disc speed, the traction rollers need to be forced into firmer engagement with the traction discs at low transmission output speeds than at high transmission output speeds where unnecessarily large contact forces would only reduce transmission efficiency and transmission life.

It is therefore the principal object of the present invention to provide a relatively inexpensive infinitely variable traction roller transmission wherein the traction rollers are forced into engagement with the respective traction discs by relatively inexpensive structures and, for some applications, preferably with an engagement force which depends on the pivot position of the traction rollers, that is, which is relatively high in a potential high-torque transmission pivot position and which is relatively low in the opposite end pivot position in which the maximum torque transmitted is relatively low.

SUMMARY OF THE INVENTION

In an infinitely variable traction roller transmission with at least two traction rollers arranged between, and in engagement with, opposite toric traction discs for the transmission of motion therebetween, each traction roller is supported by a pivotal support trunnion which has support rollers disposed at opposite ends thereof and supported on partial circular tracks disposed on the housing's inner surface for direct trunnion support. The traction rollers are supported on the pivot trunnions by force transmitting means which, for inexpensive transmissions, include stacks of Belleville springs. In certain arrangements the housing tracks have a center of curvature which is slightly off-set with regard to the pivot axis of the trunnions in order to provide greater compression of the Belleville spring, that is, greater disc engagement forces in one pivotal end position of the pivot trunnions than in their opposite pivotal end positions.

Such support structure is relatively inexpensive and yet with the arrangement with displaced support track the engagement forces applied to the traction rollers by the traction roller support structure depend on the pivot position of the traction roller support trunnion such that—depending on the use of the transmission—they are relatively high in one pivot end position and relatively low in the opposite pivot end position. This arrangement, although still relatively simple and inexpensive, provides for increased transmission lifetime since the transmission's traction roller surface areas are not subjected to the maximum traction roller surface pressures except in one of the transmission ratio end positions which is assumed by the traction rollers during only a small fraction of the transmission's operating time.

SHORT DESCRIPTION OF THE DRAWINGS

DESCRIPTION OF A PREFERRED EMBODIMENT

Figure 1:
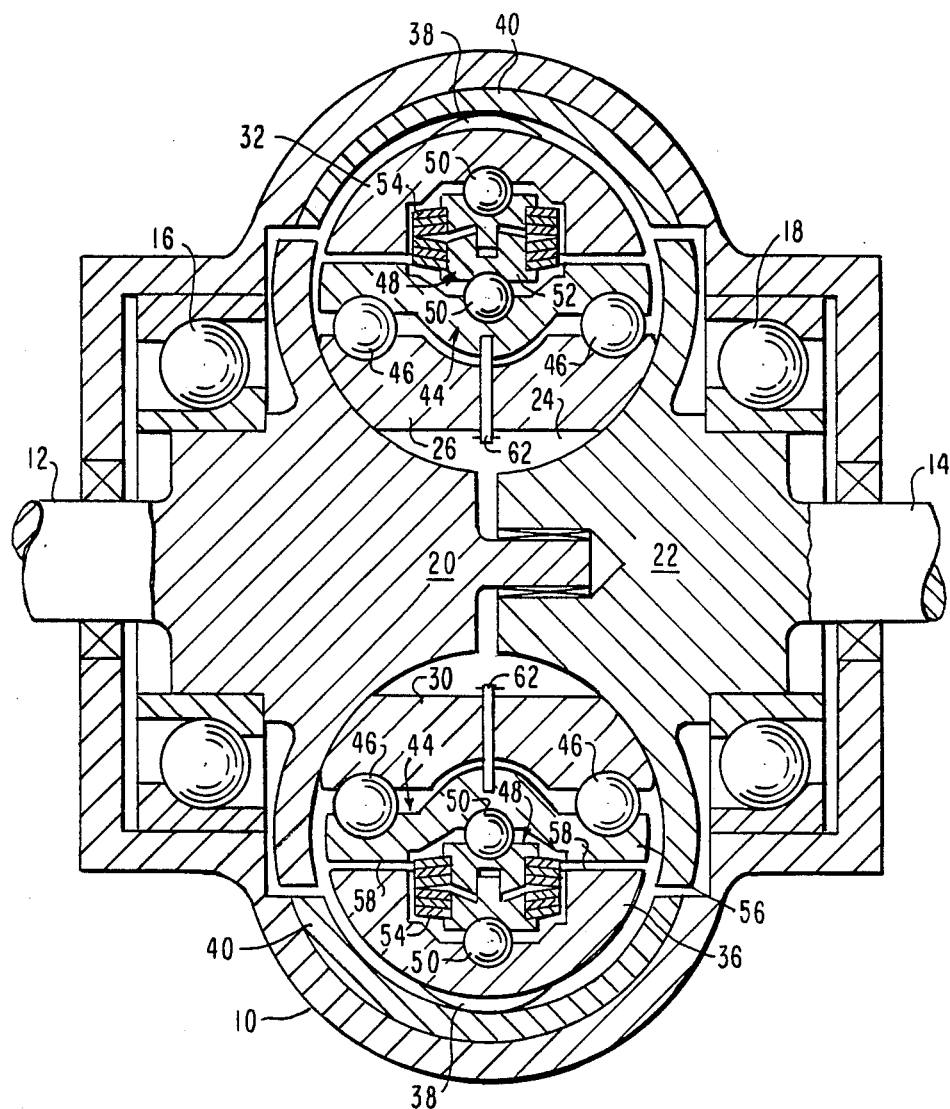
FIG. 1 is an axial cross-sectional view of the traction roller transmission.

A traction roller transmission as shown in FIG. 1 consists of a housing 10 having coaxial input and output shafts 12, 14 rotatably supported therein by bearings 16 and 18. Associated with the input and output shafts 12, 14 are toric discs 20 and 22 which are so arranged opposite one another that a toric cavity 24 of circular cross-section is defined therebetween. Within the toric cavity 24 traction rollers 26, 28 and 30 (see also FIG. 2) are rotatably supported in engagement with the toric traction discs 20, 22 for the transmission of motion therebetween. The rollers 26, 28 and 30 are supported in the housing 10 by pivot trunnions 32, 34, 36, each of which is supported directly on the housing wall by way of trunnion support rollers 38 running on hard metal tracks 40 received in track cavities 42 formed in the housing 10. Each of the pivot trunnions carries a traction roller support structure 44 including a traction roller bearing 46 disposed on a spring assembly 48 having spaced pivot balls or pins 50 engaging therebetween spring retaining members 52 with a stack of Belleville springs 54 disposed therebetween. The spaced pivot pins 50 extend parallel to the axis of the respective pivot shaft so as to permit slight displacement of the traction roller 30 relative to the pivot trunnion 36 in a direction normal to the pivot trunnion axis. The springs 54 together as a pack are very stiff providing some but only little flexibility. Actual deflection may be as little as 0.030 inch. Although supported by the pivot ball or pin 50 the bearing plate 56 has a preferably flat surface 58 disposed closely adjacent a corresponding surface 60 on the pivot trunnion 36 for backup of the bearing 46 and the roller 30. A retaining pin 62 is mounted on the bearing plate 56 and extends centrally through the roller 30 for retaining the roller 30 in position when the transmission is assembled.

Figure 2:
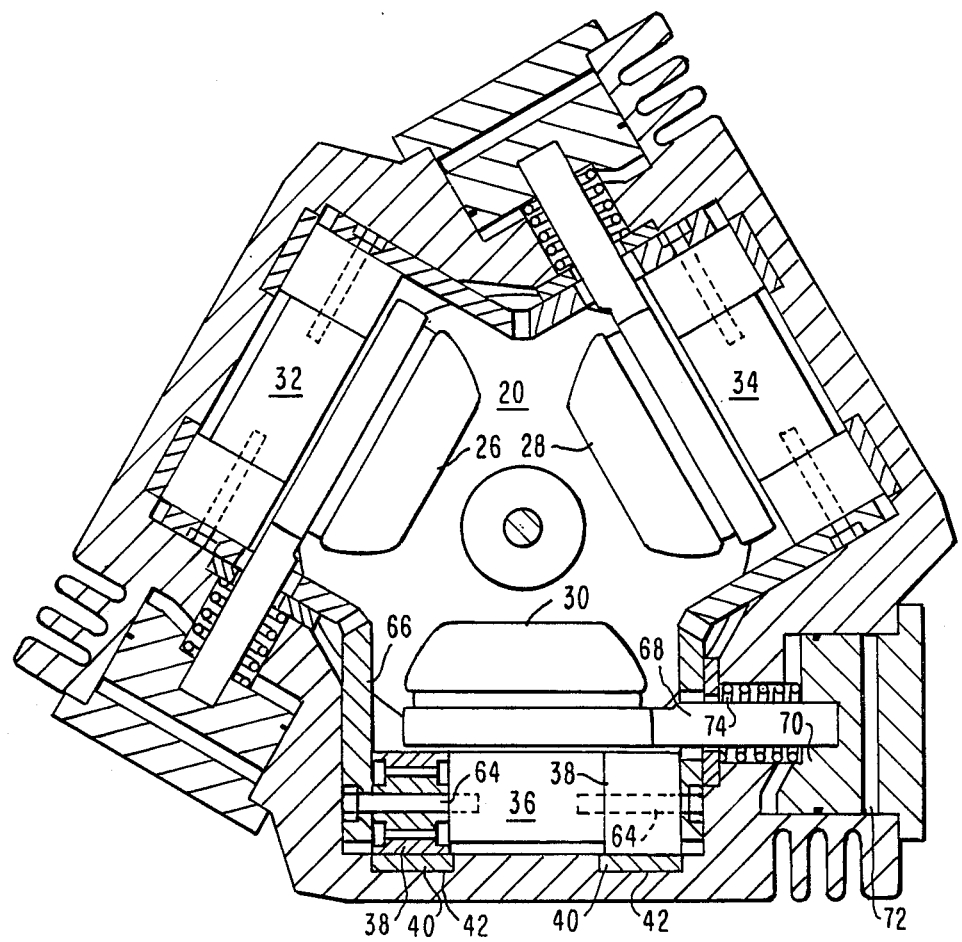
FIG. 2 is a view of the transmission in crosssection normal to the transmission axis.

FIG. 2 shows the three traction rollers and their arrangement in the transmission. All three rollers and roller supports are the same. The pivot trunnion 36 has the trunnion support rollers mounted thereto at opposite ends thereof by mounting bolts 64 which project beyond the support rollers and engage the phase gear sections 66, which phase gear sections 66 are in meshing engagement with the phase gear sections of the adjacent traction roller pivot trunnions for concurrent pivot movement of all the traction rollers in the transmission.

For precess movement control of the traction rollers 26–30 the traction roller bearing plates 56 have precess pins 68 extending therefrom essentially in the pivot axis of the pivot trunnion 36, the precess pins 68 being connected to precess pistons 70 disposed in cylinders 72.

The precess pistons 70 are biased in one direction by springs 74 and may be forced by pressurized fluid supplied to the cylinder 72 to move the piston 70 against the force of the spring 74 in the opposite direction to initiate a change in the transmission ratio.

Figure 3:
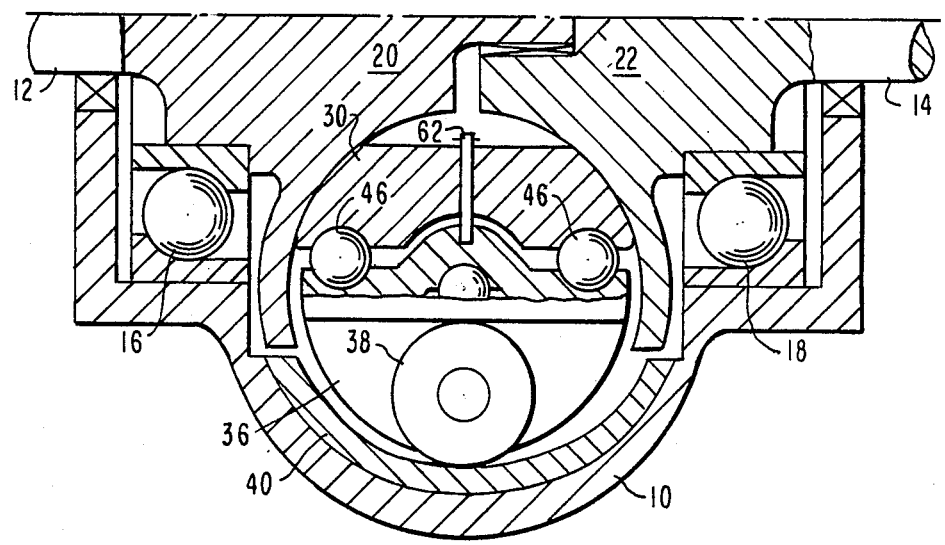
FIG. 3 is a partial sectional view showing an arrangement for loading the traction rollers in a predetermined manner.

FIG. 3 shows, greatly exaggerated, the arrangement of the hard metal roller track 40 which as shown may be arranged somewhat off-center with respect to the traction roller pivot axis which is a tangential line to the center circle of the toric cavity 24 in order to provide greater traction roller engagement forces in one pivotal end position of the pivot trunnion than in its opposite pivotal end position. It is noted however that such displacement is very small; actual deflection of the springs caused thereby is generally as low as 0.030 inch.

This transmission is small, simple and inexpensive to manufacture so that it becomes a reasonable choice for small vehicle drives such as motorcycles or for auxiliary equipment drives for automobiles, for example, in which the auxiliary equipment such as the power steering pump or the a.c. compressor would preferably be operated at about constant speed while the power supply, that is, the vehicle's engine, changes its speed over a wide range. Speed control in such an application is achieved in a simple manner by utilizing a control arrangement as disclosed for example in applicant's U.S. Pat. No. 4,501,172. If the auxiliary drive arrangement includes a power steering pump, the hydraulic fluid flow generated by such pump may be directly utilized for output shaft speed control in combination with the arrangment of U.S. Pat. No. 4,501,172 or with a control valve as disclosed in co-pending application Ser. No. 112,393. In either case the hydraulic fluid is directed to the control cylinders 72 of the present transmission so as to cause the transmission to adjust the transmission ratio for an output shaft speed which generates a desired fluid flow—a simple inexpensive control arrangement with sufficient accuracy for most applications.

LISTING OF REFERENCE NUMERALS

10 Housing
12 Input shaft
14 Output shaft
16 Input shaft bearing
18 Output shaft bearing
20 Input toric disc
22 Output toric disc
24 Toric cavity
26 Traction roller
28 Traction roller
30 Traction roller
32 Pivot trunnion
34 Pivot trunnion
36 Pivot trunnion
38 Trunnion support roller
40 Hard metal tracks
42 Track
44 Traction roller support structure
46 Traction roller bearing
48 Spring assembly
50 Pivot pins
52 Spring retaining members
54 Belleville springs
56 Bearing plate
58 Flat surface
60 Corresponding surface
62 Retaining pin
64 Mounting bolt
66 Phase gear section
68 Precess pin
70 Precess piston
72 Cylinder
74 Springs

What is claimed is:

1. An infinitely variable traction roller transmission comprising: a housing; coaxial input and output shafts rotatably supported in said housing; two toric traction discs supported opposite one another, one by said input and the other by said output shaft, said toric discs having opposite toric traction surfaces defining therebetween a toric cavity of circular cross-section; at least two motion transmitting traction rollers arranged in said toric cavity in radial symmetry and in engagement with said toric discs for the transmission of motion therebetween, each of said traction rollers being rotatably supported in said housing by a pivot trunnion adapted to pivot about an axis which is tangential to a center circle of said toric cavity, each of said pivot trunnions having a pair of axially spaced support rollers rotatably mounted thereon one each at opposite sides of the traction roller on each trunnion and said housing having partial circular tracks arranged adjacent said pivot trunnions and supporting said support rollers so as to force the traction rollers on said pivot trunnions into force transmitting engagement with said toric discs.

2. An infinitely variable traction roller transmission according to claim 1, wherein said traction rollers are supported on axial thrust bearings and force transmitting structures are disposed between said axial thrust bearings and said pivot trunnions.

3. An infinitely variable traction roller transmission according to claim 2, wherein said force transmitting structure is pivotally engaged at its opposite ends, at one end with said thrust bearing and at the other with said pivot trunnion.

4. An infinitely variable traction roller transmission according to claim 3, wherein said force transmitting structure includes a Belleville spring assembly having spring retaining members arranged movable relative to one another, one engaging said thrust bearing and the other said pivot trunnion and a stack of Belleville springs disposed between the relatively movable spring retaining members for resiliently forcing said traction rollers into engagement with said toric discs.

5. An infinitely variable traction roller transmission according to claim 2, wherein said force transmitting structure is a resilient structure and said partial circular tracks have their center of curvature slightly displaced from the center circle of said toric cavity in axial direction of said toric discs thereby to provide for greater traction roller engagement forces in one pivot end position of said pivot trunnions than in the opposite end position thereof.

6. An infinitely variable traction roller transmission according to claim 2, wherein a precess pin is connected at one end to the traction rollers thrust bearing and at the other end to a precess piston disposed in a cylinder adapted to receive pressurized fluid to provide for slight axial precessing movement of the traction roller for initiating a change of the transmission ratio.

7. An infinitely variable traction roller transmission according to claim 6, wherein said piston is spring biased in one direction, said hydraulic fluid being supplied for forcing the piston in the opposite direction against the force of said spring.

8. An infinitely variable traction roller transmission according to claim 1, wherein said partial circular tracks are formed by hardened metal inserts received in corresponding cavities in said housing.

9. An infinitely variable traction roller transmission according to claim 1, wherein said pivot trunnions have phase gear sections mounted on opposite axial ends thereof, said phase gear sections being in meshing engagement with corresponding phase gear sections of the adjacent pivot trunnions for pivotal movement of said pivot trunnions in unison.

* * * * *